United States Patent Office 3,306,134
Patented Feb. 28, 1967

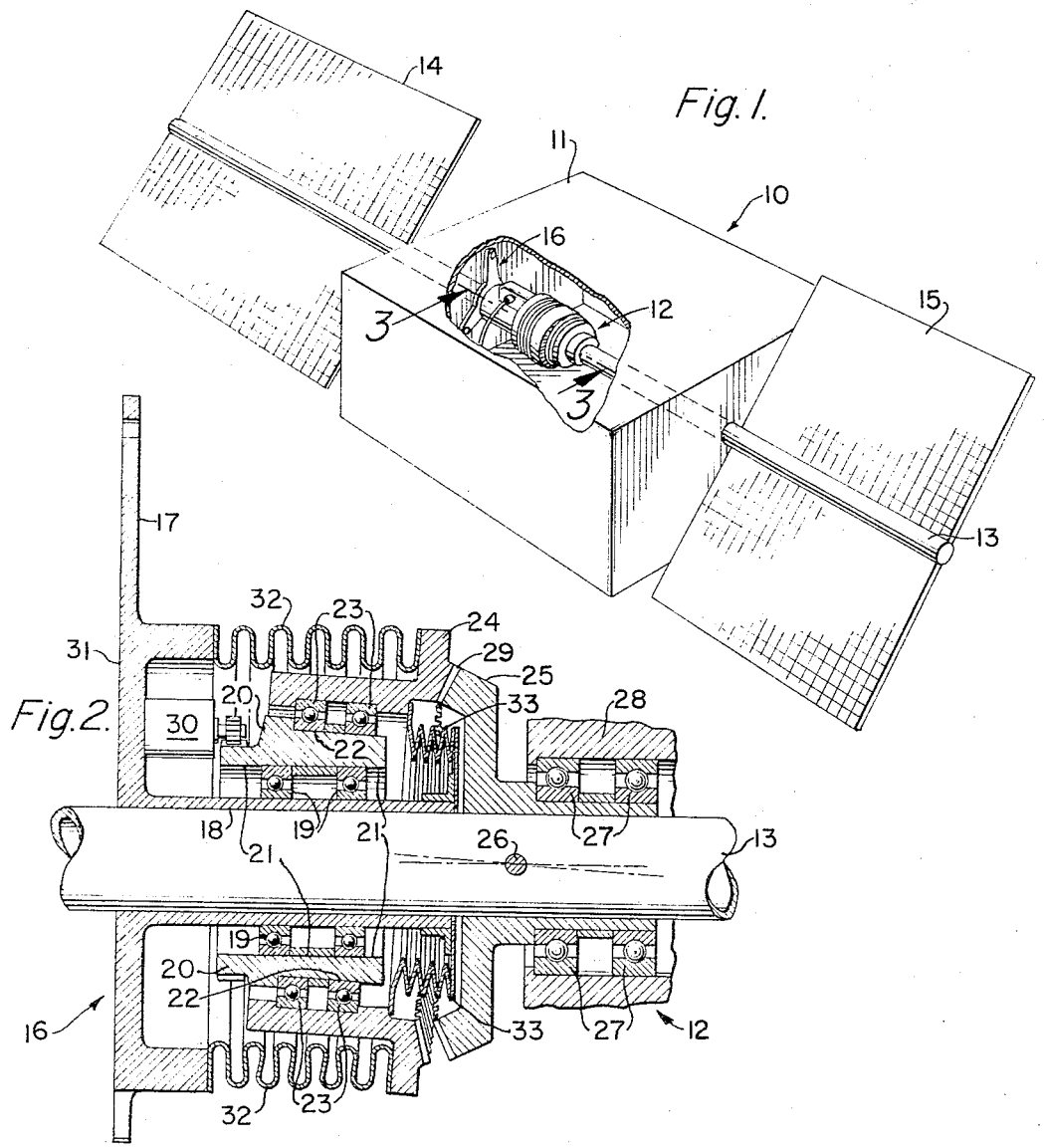

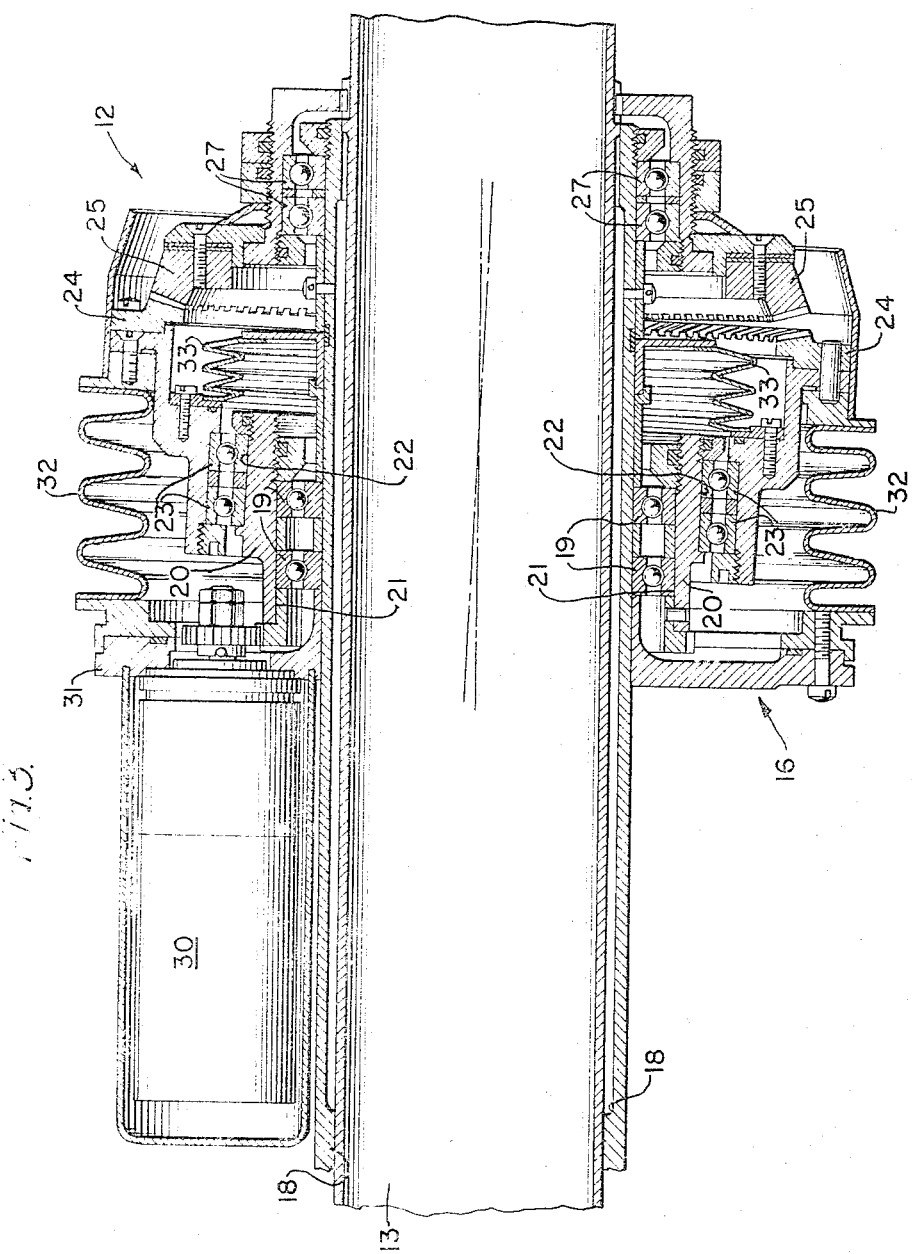

3,306,134
WABBLE GEAR DRIVE MECHANISM
Francis J. Winiarski, Los Angeles, Calif., assignor to TRW Inc., a corporation of Ohio
Filed Apr. 24, 1964, Ser. No. 362,278
6 Claims. (Cl. 74—800)

This invention relates to a drive mechanism, and more particularly to a wabble gear drive mechanism in which all moving components except the output driven gear are hermetically sealed.

This invention has particular usefulness in hazardous or other contaminating atmospheres where the driving means, for different external reasons, must be protected from the environment in which the driving means is located.

In the space field, a need arose for a drive mechanism to rotate a shaft protruding from a space vehicle. Due to the vacuum environment of outer space, it was soon realized that many solid materials sublimate and that all liquids evaporate. The oil and grease lubrications necessary for bearings and gears exposed to the hazardous vacuum environment soon evaporate, thereby causing failure of the moving surfaces. A conventional drive mechanism, composed of gears, bearings and lubrication, exposed to the hazardous vacuum environment, could not operate for an extended period of time without loss of the lubricant and subsequent failure of the load-carrying component.

In this invention there is disclosed a unique application of the wabble gear principle specifically adapted to solve the hazardous location problem by containing the moving elements, other than the output gear, within a hermetically sealed package which prevents escape of the lubricating materials.

Additionally, it is possible to select and use a preferred atmosphere in the hermetically sealed package that can now optimize the operation of the motor bearings, gearing, and gear shaft bearings. The hermetic seal is maintained by eliminating all sliding type shaft seals, which tend to cause undesired friction loading and are hence subject to wear.

In the preferred embodiment the output shaft is eventually connected to the external device being controlled and is located in the dangerous or foreign atmosphere. An output gear is mounted concentrically and aligned in a driving relationship with the output shaft. A first bearing is concentrically aligned about the output shaft and preferably on a shaft housing which surrounds the output shaft. The first bearing supports a bearing carriage which has an external surface for supporting a second bearing. The external surface of the bearing carriage defines a cylinder having an axis that is offset a given angle of approximately two degrees in the preferred embodiment with respect to the axis of the output shaft. A driving gear is mounted on the second bearing and arranged to engage the output gear at a single point due to the offset angle. In the preferred embodiment the driving gear had 101 teeth and the output gear had 100 teeth. A power source mounted on the output shaft housing, and preferably in the form of a high speed electric motor, is arranged to mechanically drive and thereby concentrically rotate the bearing carriage about the output shaft. The driving gear is physically restrained from rotating, thereby causing the driving gear to nutate about the central axis of the output shaft in what is generally known as a wabbling motion. This wabbling motion causes the contact point between the driving gear and the output gear to traverse around the circumference of the gears once every revolution of the bearing carrier. Because of the one tooth difference in the number of teeth on the gears, the output gear is advanced by an angular distance equal to the circular pitch of the teeth during each revolution of the contact point and the bearing carrier. Thus, with gears of 100 and 101 teeth respectively, a speed reduction of 100 to 1 is possible. Since the driving gear does not rotate, a first bellows arrangement connected at one end to an uppermost portion of the output gear and at the other end to an extension of the shaft housing may be used to hermetically seal the drive motor and one end of the first and second bearings. A second bellows connected at one end to a lowermost portion of the driving gear and at the other end to the shaft housing may be used to hermetically seal the opposing end of the first and second bearings, thereby hermetically sealing the driving motor, the first bearing, the bearing carriage and the second bearing. In the preferred embodiment, the defined bellows are also used to rotationally restrain the driving gear.

Further objects and advantages of the present invention are referred to in the accompanying drawings, wherein:

FIGURE 1 illustrates the application of the wabble gear for controlling solar panels for a spacecraft;

FIGURE 2 is a simplified cross section of the wabble gear assembly; and

FIGURE 3 is a cross section taken along lines 3—3 of FIGURE 1.

Referring now to FIGURE 1, there is shown a spacecraft 10 comprising a substantially rectangular main section 11 arranged to house the necessary scientific experiments and telemetering equipment. Located within the main section 11 is a wabble gear drive mechanism 12 arranged to rotate an output shaft 13. A plurality of solar paddles 14 and 15, each arranged to support a plurality of individual solar cells, are continuously arranged to be positioned by means of the shaft 13 so to face the rays of the sun at substantially right angles. Power generation for the spacecraft 10 is achieved by the solar cell rays of solar paddles 14 and 15. In the spacecraft embodiment full face illumination of the solar cells on the paddles 14 and 15 is achieved by rotation of the output shaft 13, which position is controlled by a feedback control system actuated by sun sensors not illustrated. The present invention is concerned primarily with the drive mechanism 12, which is illustrated in connection with a spacecraft 10 for convenience only to more fully illustrate the benefits to be derived for operating the drive mechanism in a hostile environment.

Referring now to FIGURE 2, there is shown a simplified cross section of the wabble gear drive mechanism 12 taken along lines 2—2 of FIGURE 1. The mechanism 12 is constructed around the output shaft 13 and comprises a housing 16, having a flanged portion 17 adapted to be connected to a supporting member and a cylinder portion 18 constructed concentrically about the shaft 13. A first set of bearings 19 are mounted on the cylindrical portion 18 in such a manner as to be concentrically aligned with respect to the output shaft 13. Mounted on bearings 19 is a bearing carriage 20 having a first surface 21 supported by the bearings 19 so as to run true and be parallel with an axis of the output shaft 13. The external or outside surface 22 of the bearing carriage 20 defines a cylinder having an axis that is offset a given angle with respect to the axis of the output shaft 13. This outside surface 22 supports a set of bearings 23, which supports a driving gear 24 at the same offset angle. The driving gear meshes with an output gear 25 that is concentrically aligned and directly attached to the output shaft 13 by means of a pin 26. The output shaft 13 is externally supported by means of bearings 27 and an external mounting bracket 28. Due to the offset angle determined by the outside surface 22 of the bearing carriage 20, the driving gear 24 will mesh in a driving relationship with the output gear 25 at a single point on the periphery. This is shown by the meshing of gears 24 and 25 on the uppermost portion of the figure at location 29. An electric driving motor 30 is mounted on a flange portion 31 of the housing 16 and arranged to drivingly engage the bearing carriage 20. Rotation of the output shaft of the electric motor 30 causes the bearing carriage 20 to rotate about the output shaft 13. In the preferred embodiment, a bellows arrangement 32 is fixedly attached at one end to the flanged portion 31 of the housing 16 and at the other end to the outermost external portion of the driving gear 24. The bearings 19 and 23, bearing carriage 20, and the electric motor 30, are hermetically sealed by means of a second bellows arrangement 33 that is connected at one end to an internal portion of the driving gear 24 and at the other end to the cylinder portion 18 of the housing 16, thereby completely hermetically sealing the defined arrangements.

In operation, the necessary wires for controlling the electric motor 30 pass through a first sealed portion and, when energized, will cause the bearing carriage 20 to rotate concentrically about the output shaft 13. The bearings 19 ensure the defined concentricity; however, bearings 23, which support the driving gear 24 at the offset angle, are free to rotate and will not impart a rotating driving motion to the driving gear 24. Any tendency for the driving gear 24 to rotate is effectively prevented by means of the bellows 31 and 32. Since the bearing carriage 20 is free to rotate, a review of the geometry will show the driving gear 24 is caused to move in a fore and aft direction in the general direction of the axis of rotation of the rotating shaft 13. In actual practice, the contacting points 29 of the driving gear with the output gear 25 are progressively moved along the periphery of the two gears, thereby resulting in what has been termed a nutating motion, which causes the point of mesh of the gears 29 to traverse about the circumference of the gears once per revolution of the bearing carriage 20. In the preferred embodiment, the driving gear 24 had 101 teeth and the output gear 25 had 100 teeth, thereby achieving a speed reduction of 100 to 1.

Referring now to FIGURE 3, there is shown a cross section of the drive mechanism 12 illustrated in FIGURE 1 taken along lines 3—3. Since FIGURE 3 is a cross section of the actual device built and tested, there is considerably more detail; however, in the interests of conformity and ease of explanation, similar numbers are used in FIGURE 3 as are used in FIGURE 2 where the items perform similar functions. The output gear 25 is attached to the shaft 13 that is to be driven. The gear 25 may be considered to be a bevel gear with a very short, stubby, convex, conical, pitch surface. The driving gear 24 is of the same general configuration as the output gear 25, except that the driving gear 24 contains one tooth more than the output gear on a concave, conical, pitch surface of slightly larger apex angle. The driving gear 24 is made to mesh face to face with the output gear 25 such that engagement takes place at one point along the circumference. This is accomplished by the bearing 23, which positions the driving gear 24, which is mounted on the carrier 20 at a slight angular inclination to the central axis of the output gear 25. The driving gear 24 is not permitted to rotate by virtue of the attachment to stationary structure through the bellows 32 and 33, which permits flexure in the pitch and yaw directions but not in roll. Thus, it can be seen that as the bearing carrier 20 rotates, the inclined mounting of the bearing 23 causes the driving gear 24 to perform a wabbling, irrotational motion. This wabbling motion causes the contact point between the output gear 25 and the driving gear 24 to traverse around the circumference of the gears once per revolution of the bearing carrier 20. The adaptability of this wabble gear principle stems from the somewhat unique property of the driving gear which does not rotate and yet causes its mate to rotate about the central axis. It can be seen that this non-rotating, driving gear can become, in fact, part of the container wall of a hermetically sealed package wherein a pair of linear, metallic, convoluted bellows flex to accommodate the irrotational, wabbling motion. Consequently, the driving motor, gearhead, and intermediate gearing and bearings are contained inside of a hermetically sealed container to prevent escape of conventional lubricants and ingestion of externally generated contaminant particles.

This completes the description of the embodiment of this invention; however, many modifications may be made, such as the shape and size of the housing 16 which forms part of the hermetic seal. Accordingly, it is desired that this invention not be limited to the deails of the embodiment disclosed herein, except as defined by the appended claims.

The embodiments of the invention in which an exclusive property or privilege is claimed are defined as follows:

1. In combination, an output shaft,
an output gear concentrically mounted and aligned in a driving relationship with the output shaft, a bearing carriage,
a first bearing concentrically aligned about said output shaft for supporting the bearing carriage, a second bearing,
said bearing carriage having an external surface for supporting the second bearing, said external surface defining a cylinder having an axis that is offset a given angle with respect to the axis of said output shaft,
a driving gear mounted on said second bearing and engaging said output gear at a single point due to said offset angle,
a power source for driving said bearing carriage, and a rotational restraining device connecting said driving gear whereby rotation of said bearing carrier about said output shaft causes said driving gear to nutate about the circumference of said output gear and depending on the gear teeth relationship cause a rotary motion of said output gear, said rotational restraining device hermetically sealing said power source and said first and second bearings.

2. A combination according to claim 1 in which said driving gear has at least one tooth more than the number of teeth on said output gear to thereby obtain a speed reduction.

3. A combination according to claim 1 in which said power source comprises an electrically operated rotor having an output shaft mechanically coupled in a driving relationship with said bearing carriage.

4. In combination, an output shaft,
a walled structure defining a passageway for the output shaft,
an output gear concentrically mounted and aligned in a driving relationship with said output shaft, a bearing carriage,
a first bearing mounted on said walled structure concentrically with said output shaft for supporting the bearing carriage, a second bearing,
said bearing carriage having an external surface for supporting the second bearing, said external surface defining a cylinder having an axis that is offset a given angle with respect to the axis of said output shaft,
a driving gear mounted on said second bearing and engaging said output gear at a single point due to said offset angle,
a power source for driving said bearing carriage, and a rotational restraining device connecting said driving gear whereby rotation of said bearing carriage about said output shaft causes said driving gear to nutate about the circumference of said output gear and depending on the gear teeth relationship cause a rotary motion of said output gear, said rotational restraining device comprising a first and second bellows, said first bellows anchored at one end to said driving gear and at the other end to an extension of said walled structure, covering said power source, said second bellows anchored at one end to said driving gear and at the other end to an extension of said walled structure enclosing said first and second bearings whereby said drive mechanism from the power source to the driving gear is hermetically sealed.

5. A combination according to claim 4 in which said power source comprises an electric rotor located in said hermetically sealed environment.

6. A combination according to claim 4 which includes an inert gas under pressure in said hermetically sealed environment.

References Cited by the Examiner

UNITED STATES PATENTS

| | | | |
|---|---|---|---|
| 1,587,298 | 6/1926 | Gilman | 74—800 X |
| 2,545,335 | 3/1951 | Becker | 184—1 |
| 2,545,562 | 3/1951 | Thiel | 74—800 |
| 2,617,494 | 11/1952 | Becker | 184—1 |
| 2,699,690 | 1/1955 | Kobler | 74—800 |
| 2,830,454 | 4/1958 | Karn | 74—800 X |

FOREIGN PATENTS 1,356,830  2/1964  France.

DAVID J. WILLIAMOWSKY, *Primary Examiner.*

J. R. BENEFIEL, *Assistant Examiner.*